United States Patent
Brack et al.

(10) Patent No.: US 8,309,275 B2
(45) Date of Patent: Nov. 13, 2012

(54) MEMBRANE ELECTRODE ASSEMBLY (MEA), METHOD FOR ITS MANUFACTURING AND A METHOD FOR PREPARING A MEMBRANE TO BE ASSEMBLED IN A MEA

(75) Inventors: Hans-Peter Brack, Herrliberg (CH); Günther Scherer, Hägglingen (CH); Lorenz Gubler, Nussbaumen (CH)

(73) Assignee: Paul Scherrer Institut, Villigen PSI (CH)

( * ) Notice: Subject to any disclaimer, the term of this patent is extended or adjusted under 35 U.S.C. 154(b) by 758 days.

(21) Appl. No.: 10/577,223

(22) PCT Filed: Sep. 14, 2004

(86) PCT No.: PCT/EP2004/010252
§ 371 (c)(1),
(2), (4) Date: Jul. 26, 2006

(87) PCT Pub. No.: WO2005/031906
PCT Pub. Date: Apr. 7, 2005

(65) Prior Publication Data
US 2006/0280980 A1     Dec. 14, 2006

(30) Foreign Application Priority Data

Sep. 26, 2003  (EP) .................................... 03021845
Dec. 16, 2003  (EP) .................................... 03028850

(51) Int. Cl.
*H01M 4/88*   (2006.01)
*H01M 4/94*   (2006.01)
*H01M 4/96*   (2006.01)

(52) U.S. Cl. .......... 429/523; 427/115; 502/101; 521/27; 521/28

(58) Field of Classification Search .................... 429/12, 429/13, 33, 34, 523; 521/27, 28; 427/115; 502/101
See application file for complete search history.

(56) References Cited

U.S. PATENT DOCUMENTS

| | | | |
|---|---|---|---|
| 4,605,685 A | 8/1986 | Momose et al. | |
| 5,656,386 A | 8/1997 | Scherer et al. | |
| 6,444,343 B1 | 9/2002 | Prakash et al. | |
| 6,465,120 B1 * | 10/2002 | Akita et al. | 429/494 |
| 2003/0054219 A1 * | 3/2003 | Won et al. | 429/33 |
| 2003/0113604 A1 | 6/2003 | Bahar et al. | |
| 2004/0062970 A1 * | 4/2004 | Nomura et al. | 429/33 |
| 2004/0106044 A1 * | 6/2004 | Kerres | 429/314 |
| 2004/0115499 A1 * | 6/2004 | Tani et al. | 429/30 |

OTHER PUBLICATIONS

Huslage et al., Radiation-grafted membrane/electrode assemblies with improved interface, 2002, Electrochimica Acta, 48, pp. 247-254.*
Ticianelli et al., Methods to Advance Technology of Proton Exchange Membrane Fuel Cells, 1988, Mass Transfer, vol. 135, No. 9, pp. 2209-2214.*

* cited by examiner

*Primary Examiner* — George Wyszomierski
*Assistant Examiner* — Jared Wood
(74) *Attorney, Agent, or Firm* — Young & Thompson

(57) ABSTRACT

A method for preparing a membrane to be assembled in a membrane, electrode assembly includes the step of swelling an ion-conducting membrane in a liquid containing at least one solvent or to an atmosphere containing the vapor phase of at least one solvent by controlling the content of the solvent in the ion-conducting membrane. A method for manufacturing a membrane electrode assembly using an ion conducting membrane includes the steps of: providing an ion-conducting membrane in a pre-swollen state; coating the ion-conducting membrane on both sides with an electrode layer to form a sandwich; and hot-pressing the sandwich to form an ion-conducting bonding of the layers of the sandwich. Furthermore, a membrane electrode assembly is disclosed including a hot pressed sandwich having an electrode layer, a ion-conducting membrane and again an electrode layer, thereby using the ion-conducting membrane in its pre-swollen status prior to the hot-pressing.

15 Claims, 2 Drawing Sheets

MEMBRANE ELECTRODE ASSEMBLY (MEA), METHOD FOR ITS MANUFACTURING AND A METHOD FOR PREPARING A MEMBRANE TO BE ASSEMBLED IN A MEA

FIELD OF THE INVENTION

The invention relates to a method for manufacturing a membrane electrode assembly and to a method for preparing a membrane to be assembled in an membrane electrode assembly. Further, the invention relates to a membrane electrode assembly.

BACKGROUND OF THE INVENTION

Rapid and simple methods for creating Membrane Electrode Assemblies (MEAS) having optimized interfaces are desired. As discussed by Huslage et al. [J. Huslage, T. Rager, B. Schnyder, and A. Tsukada "Radiation-grafted membrane/electrode assemblies with improved interface" Electrochim. Acta 48 (2002) 247-254], the preparation of such optimized interfaces with radiation-grafted crosslinked membranes has been a long-standing problem in the field. In particular, they noted poor electrochemical interface formation is characterized by unstable fuel cell performance, lengthy run-times until steady-state performance is achieved, and poor adhesion between membrane and electrodes even after extended fuel cell testing. Therefore, it is clear that the optimization of the electrochemical interface of MEAs is quite important in obtaining high performance in the fuel cell application. For example, the optimization of this interface allows one to obtain better cell polarization performance and higher power densities with the same fuel cell components, e.g. membrane and electrodes etc.

As discussed by Huslage et al., it is especially difficult to obtain an optimal electrochemical interface in MEAs containing radiation-grafted crosslinked membranes having low graft levels. This interfacial problem is quite important to solve because both Huslage et al. and later Kuhn et al. (H. Kuhn, L. Gubler, T. J. Schmidt, G. G. Schmidt, H.-P. Brack, K. Simbek, T. Rager, and F. Geiger, "MEA Based on Radiation-Grafted PSI-Membrane: Durability and Degradation Mechanisms", Proceedings of the $2^{nd}$ European PEFC Forum, 2-6 Jul. 2003, ISBN 3-905592-13-4, pages 69-77.) demonstrated that such membranes can operate in fuel cells under steady state conditions for several thousands of hours with no observable loss in the output of the fuel cell or degradation in membrane or cell properties or performance.

The typical preparation of such radiation-grafted membranes is described in the above-cited publication by Huslage et al. or in, for example, the European patent EP 0 667 983 B1. Often, they are prepared from 25 μm thick films of FEP base polymer and using monomer solutions containing about 10 vol % of the crosslinker, DVB. These membranes typically have graft levels of about 18 to 20 mass percent, and their spectroscopic properties and the isomer ratios of the graft component have been reported by Brack et al. (H.-P. Brack, D. Fischer, M. Slaski, G. Peter, and Gunther G. Scherer, "Crosslinked Radiation-Grafted Membranes, Proceedings of the $2^{nd}$ European PEFC Forum, 2-6 Jul. 2003, ISBN 3-905592-13-4, pages 127-136).

Huslage et al. reported that mechanical properties of the membranes were improved by limiting the graft level to such rather low values, and that the corresponding losses in conductivity at low graft levels could be compensated by an improvement in the membrane/electrode interface.

According to the publication by Huslage et al., "MEAs with an improved interface between the membrane and commercially available gas diffusion electrodes were obtained by Nafion®-coating of the membrane and hot-pressing."

Unfortunately, these progress could not be successfully reproduced. Working according to the teaching of Huslage et al. by preparing optimized MEAs from radiation-grafted membranes by Nafion®-coating of the membrane and hot-pressing delivered the quite surprisingly result that alone these two steps of (1) Nafion-coating and (2) hot-pressing do not make it possible to obtain MEAs having favorable electrochemical properties such as low ohmic or charge-transfer resistances or having favorable performance properties in fuel cells.

In the prior art studies, documents published by Supramanium Srinivasan were found emphasizing the major breakthrough obtained in making a 10-fold reduction in platinum loading from about 4 mg $cm^{-2}$ to 0.4 mg $cm^{-2}$ or less. For example, S. Srinivasan and P. Costamanga review this breakthrough in "Quantum jumps in the PEMFC science and technology from the 1960s to the year 2000 Part I. Fundamental scientific aspects", J. Power Sources, 102 (2001) 242-252. He attributes this breakthrough to (i) an increase in the BET surface energy of the electrocatalysts, and (ii) an extension of the 3-dimensional electrochemically active zone in the electrode by the impregnation with the proton conductor Nafion® membrane. In this same publication, S. Srinivasan et al. state that the electrodes are hot-pressed to the membrane "under the desired conditions of temperature (130-140° C.), pressure (2000 psi) and time (about 1 min)". Unfortunately, S. Srinivasan et al. did not state however anything about a pretreatment or pre-conditioning of the membrane prior to the hot-pressing.

In addition, their teaching that hot-pressing should be done close to the glass-transition temperature is ambiguous. It is not clear if they mean the glass-transition temperature of the form of the membrane during hot-pressing or any other type of a pretreated membrane. Also, the term "close to" is not specified and could mean one degree or many degrees Celsius. Nor is it indicated whether there is difference or preference between hot-pressing below, at, or above the glass transition.

SUMMARY OF THE INVENTION

It is therefore the aim of the invention to provide a method for the manufacturing of a membrane electrode assembly and a method for preparing a membrane for use thereof and a membrane electrode assembly providing improvements with respect to bonding, lifetime and performance properties.

Spoken in general terms, the inventive concept comprises to control the water-content of the membrane during hot pressing because this parameter turned out to be critical to give an optimized MEA interface and favorable electrochemical properties and fuel cell performance. This invention and its various embodiments and reduction to practice will be described later and can be studied from the appending claims.

DETAILED DESCRIPTION OF THE INVENTION

Figure 1:
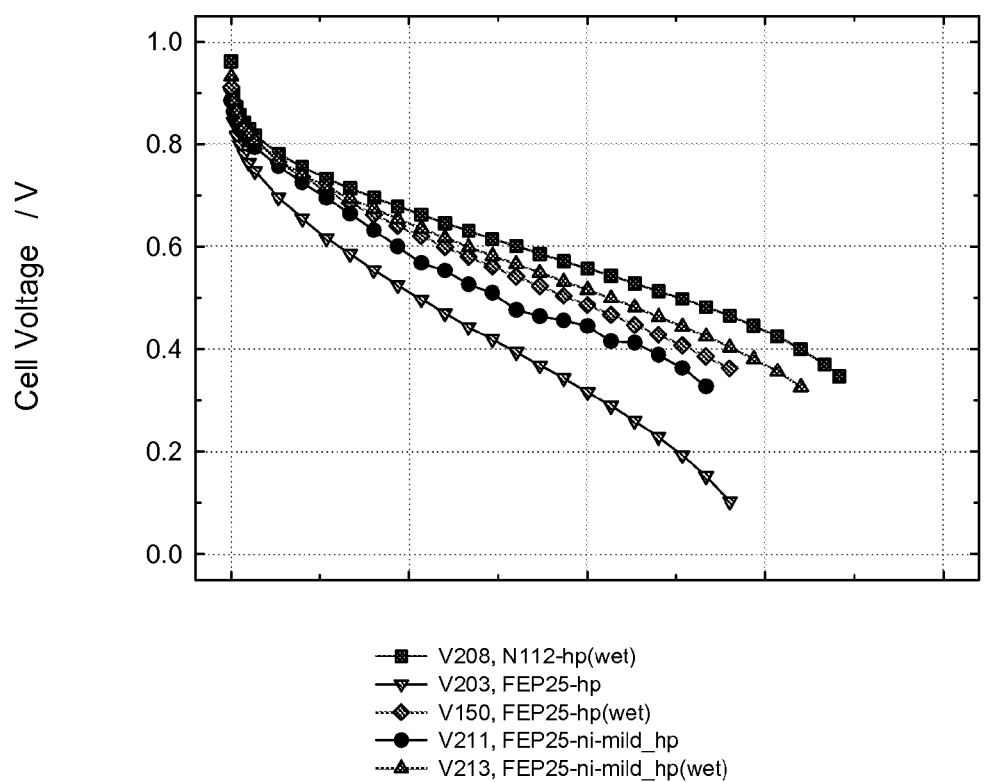
FIG. 1 depicts typical cell polarization curves of fuel cells containing the various MEAs described in the working and comparative examples.

Therefore, an ion-conducting membrane, in a swollen state characterized by a relatively high surface energy or low contact angle with water for that material, is bonded together with two electrodes under conditions of elevated pressure and/or temperature. The state of swelling of the ion-conducting membrane is conveniently varied by exposing the membrane to one or more liquid solvents or to atmospheres containing the vapor phase of one or more solvents. The method of membrane swelling is not specifically limited. Non-limiting examples such solvents include water, ethylene glycol, propylamine, propanol, propionic acid, and propionaldehyde, acetone, acetonitrile, N-butyl glycolate, N,N'-di-n-butylacetamide, diethoxyethane, diethyl carbonate, 1,3-dioxolane, dimethylacetamide, N,N'-dimethyl butyramide, dimethyl carbonate, N,N'-dimethyl decanamide, dimethoxyethane, dimethyl ethane sulfonamide, N,N'-dimethyl formamide, N,N'-dimethyl propyleneurea, dimethyl sulfoxide, dimethyl sulfite, 2,5-dimethoxytetrahydrofuran, ethyl acetate, 2-ethoxyethyl acetate, ethylene carbonate (1,3-dioxolan-2-one), ethyl glycolate, $CH_3OC_4F_9$, $CF_3CF_2CF_2OCF(CF_3)CF_2OCHFCF_3$, γ-butyrolactone, methyl acetate, 2-(2-(2-methoxyethoxy)ethoxy)-1,3-dioxolane, methanol, methyl formate, methyl glycolate, methyl tert-butyl ether, N-butyl amine, N-methyl formamide, N-methyl-2-pyrrolidone, propylene carbonate, poly(ethylene glycol), 4-(1-propenyloxymethyl)-1,3-dioxolan-2-one, sulfolane, tetrabutylammonium, triethylphosphate, tetrahydrofuran, and 3-methyl sydnone. In one embodiment, an ion-exchange membrane is treated in deionized water for about 4 or 5 h at a temperature of about 80° C.

The type of membrane used in this invention is not specifically limited. Any organic or inorganic or organic/inorganic or composite membrane capable of transporting protons at the operating temperatures of interest is suitable. The organic component may be polymeric in nature. The composition and chemical structure of the membrane is also not limited. The membrane will generally be selected according to the desired properties for the membrane, for example, conductivity, dimensional stability, gas separation, methanol impermeability or mechanical properties. Some non-limiting examples of ionomeric membranes include copolymers of fluorinated monomers like tetrafluoroethylene and ion-conducting or acidic comonomers or their precursors. Non-limiting examples of such polymers are the perfluorosulfonic acid (PFSA) polymer Nafion® membranes by DuPont or related materials from Asahi Glass (Flemion membrane), Asahi Chemical, or Dow. Such ionomeric membrane materials may also be used in the form of composites, such as in the case of the composite micro-reinforced membrane found in the PRIMEA® MEA from Gore. The composition, shape and form of the membrane are not specifically limited. Such perfluorinated membranes are often cleaned and put fully into the acid form prior to MEA assembly by treating them for short periods of time with strong acid solutions. In one embodiment they are treated with about a 35 weight % solution of nitric acid for one hour prior to swelling. After acid treatment, the acid is removed from the membranes typically by rinsing the membrane with water until the rinse water is neutral.

The electrochemical performance of the MEA and fuel cell in some cases may be enhanced by impregnation of the membrane with another ionically conducting polymeric phase in order to extend the volume of the 3-dimensional electrochemically active zone or to improve the surface or bonding properties of the membrane in the MEA preparation. This impregnation can be carried out by means known in the art such as spraying or dipping the membrane with a solution of an ionically conducting polymer such as the Nafion® polymer or other perfluorinated, partially fluorinated, or non-fluorinated ionomers. After the impregnation process is complete, the membrane may be dried at elevated temperatures, typically 100 to 140° C. in the case of Nafion® polymer, in order to remove residual solvent and to transform the ionomer into the form of an insoluble solid.

In one embodiment, the membrane is a radiation-grafted membrane. The composition and structure of the radiation-grafted-membrane is not specifically limited. Generally, the graft level shall be in the range of 10 to 40 mol % as compared to the original amount of membrane material. For example, the radiation-grafted membrane may be prepared from a variety of base polymer films including fluoropolymers, such as PTFE and its copolymers including FEP, ETFE, or PVDF, or polyolefins such as polyethylene, polypropylene and their copolymers. The type of radiation used to prepare the membrane is not specifically limited and includes electromagnetic radiation like UV or X-rays or particle radiation such as electron beam. In some cases a vacuum or inert irradiation atmosphere will be selected in order to minimize degradation of the base polymer. Films can be grafted simultaneously along with the irradiation process, or the grafting can be done in a post-irradiation step.

If the grafting is done in a subsequent step, the irradiated substrate may be stored at reduced temperature and/or under inert atmosphere if the reactive sites are unstable. The physical form of the monomer for grafting may be as a gas or a liquid, and the monomer may be either pure or diluted with a solvent or inert material and/or as a mixture with one or more additional monomers. Any radically active monomer may be used including vinyl, styrenic or acrylic monomers. Monomers can be selected according to the properties that are desired for the membranes. For example, if it is desired that the membrane conduct ions, monomers having acidic, basic, salt or amphoteric functionality or their precursors may be selected. Non-limiting examples of monomers having acidic, basic, salt, or amphoteric functionality include vinyl phosphonic acid, vinyl sulfonic acid, 3-[(2-acrylamido-2-methylpropyl)dimethylammonio]propanesulfonate, sodium styrene sulfonate, N-vinyl-2-pyrrolidone, 4-vinyl pyridine. Monomers that can be used as precursors for the introduction of acidic, basic, and amphoteric groups may also be used. Non-limiting examples include styrenic monomers such as styrene, α,α,β-trifluorostyrene, α-fluorostyrene, and vinylbenzyl chloride and their derivatives. Crosslinking monomers known in the art, such as divinyl benzene or bis(vinyl phenyl) ethane, can be used to modify the swelling, gas or liquid crossover properties, or stability and durability of such membranes. The content of such crosslinking monomers in a grafting solution shall be in the range of some percent and shall not exceed 25%, preferably not exceed 20%. The solution may be added by styrene to 100%. The grafted polystyrenic chains can later be derivitized using methods known in the art to yield acidic, basic, or amphoteric functionalities in the membrane. For example, anion-exchange groups can be introduced by means of subsequent amination followed by ion exchange with aqueous hydroxide, and cation exchange groups can be introduced by treating with strong acids such as chlorosulfonic or sulfuric acids or sulfur trioxide dissolved in halogenated solvents. The fully acid forms of such membranes are typically obtained by treating them first with basic solution, followed by regeneration in acid, and finally rinsing with water. In one embodiment, a freshly sulfonated membrane is treated first with 0.1 M NaOH for at least about 12 h and then for about 5 h in 2 M $H_2SO_4$.

The electrode shapes, forms, structures and compositions are not specifically limited. Generally they will be electronically conducting and additionally nay have catalysts present on or in them. Often they will have the capability to allow the transport or diffusion of gaseous or liquid reagents through at least some regions of their structure. Non-limiting examples of electrode materials include carbon cloth, carbon paper, or carbon felt. For the case of fuel cell electrodes, additional catalysts may used in order to catalyze electrochemical oxidation or reduction reactions. Non-limiting examples of catalysts include platinum on carbon, platinum black or platinum alloys with other metals such as ruthenium or metal oxides, and Raney nickel together with carbon blacks. Some of these alloys may be applied to advantage in minimizing the poisoning of electrode surfaces with CO and other species and in catalyzing the oxidation of methanol, other alcoholic species, or even hydrocarbons. The electrochemical performance of the electrode, MEA and fuel cell can be significantly enhanced by impregnation of electrodes with an tonically conducting polymeric phase in order to extend the volume of the 3-dimensional electrochemically active zone. This impregnation can be carried out by means known in the art such as spraying, dipping, or wetting the surface of the electrode with a solution of an ionically conducting polymer such as the Nafion® polymer or other perfluorinated, partially fluorinated, or non-fluorinated ionomers. After the impregnation process is complete, the electrode may be dried at elevated temperatures, typically 100 to 140° C. in the case of Nafion® polymer, in order to remove residual solvent and to transform the ionomer into the form of an insoluble solid.

The preparation of a membrane electrode assembly according to the invention can be described as follows: An ion-conducting membrane is pre-swollen in a solvent such as water. Care is taken that the membrane remains in a swollen, plasticised state characterized by an increased surface energy and more hydrophilic surface during the MEA assembly process. The effects of swelling on the mechanical and surface properties of the membrane can be readily varied by the choice of solvent.

For example, polar and hydrogen-bonding solvents will better swell and thus more greatly influence the mechanical and surface properties of membranes containing polar and hydrogen-bonding functional groups like acidic, basic, or amphoteric ones. The extent of swelling of the membrane can be readily controlled by methods known to those art, including the volatility of the chosen solvent, the exposure time to the solvent and its concentration, the means of solvent exposure, the atmosphere to which the membrane is exposed to after swelling, and the duration of this exposure prior to hot-pressing of the MEA. In one embodiment, a coating of catalyst may be applied to the membrane prior to MEA assembly by means of spraying, dipping, sputtering or other methods known in the art.

Typically the swollen form of the membrane is then placed in intimate contact with two electrodes, one on each side. The MEA sandwich is then hot-pressed for a period of time at elevated pressure and temperature. The exact hot-pressing conditions are not specifically limited, and the optimum conditions will depend somewhat on the membrane and electrode properties such as hardness, surface energy, and mechanical and chemical stability. Various combinations of the conditions of temperature, pressure and time may be made. For example, the use of higher temperatures will generally make it possible to use somewhat shorter hot-pressing times or lower pressures. In another case, the use of higher pressures will make it possible to use somewhat lower temperatures and shorter hot-pressing times. In yet another case, the use of longer pressing times will make it possible to use lower temperatures and pressures. Typically hot-pressing temperatures of between about 60 and about 150° C. may be used. In one embodiment the temperature is about 110° C. In general, the use of too high temperatures in undesired because it may lead to membrane drying or even decomposition, especially in the presence of oxygen. Too low a temperature may lead to poor MEA bonding. Typically hot-pressing pressures of between about 2 and about 30 MPa may be applied. In one embodiment the applied pressure is about 5 to about 18 MPa. Again, too high pressure may lead to degradation, and too low a pressure may lead to poor bonding. The duration of the hot-pressing treatment may vary between about 15 sec and about 10 minutes. In one embodiment, the duration is about 3 min.

The applications of these NEAs are not specifically limited. These MEAS may find application in a variety of electrochemical processes, cells, and devices, for example, in fuel cells, electrolysis cells, and batteries. Such electrochemical cells may be used individually or in assemblies of several cells connected in series or parallel. The fuel cells may be powered using a variety of fuels in either gaseous or liquid form, such as hydrogen, methanol, or reformate either in a pure form or in mixtures with other components. The fuel cells may operate using a variety of oxidants in either gaseous or liquid form, such as oxygen or air either in a pure form or in mixtures with other components.

This invention was first reduced to practice in a collaboration of the Fuel Cells Group and Materials II Group of the Laboratory for Electrochemistry (both at Paul Scherrer Institut, Villigen, Switzerland). Radiation-grafted membranes were prepared. They were made from 25 µm thick FEP films (FEP 100 A) purchased from DuPont, Circleville, Ohio, USA. It should be pointed out that the depth of the membrane shall be in the range of 5 to 250 µm, preferably 20 to 200 µm. The membranes were prepared according to the method described by Huslage et al. and they are referred to here as FEP-25 membranes. An irradiation dose of 3 kGy and reaction times of 3.5 h at 60° C. were used. The grafting solutions containing 10 vol % of the crosslinker, DVB, relative to styrene. The acid form of the membranes were swollen in a deionized water bath at 80° C. for about five hours. The graft levels of the resulting membranes were between 18 to 20 mass %, and the ion-exchange capacities were between 1.25 and 1.35 mEq/g.

For comparison purposes the membrane Nafion® N-112 membrane was purchased from the DuPont company. This membrane material was first treated for one hour at 90° C. in a 1:1 (vol:vol) solution of concentrated $HNO_3$ (65%) in deionized water. Next the Nafion® membrane was repeatedly treated by swelling over several hours at about 95° C. in several baths of deionized water until the bath water remains neutral. This membrane has an ion-exchange capacity of about 0.9 mEq/g and a water swelling of about 20 mass %.

All swollen membrane materials were stored in deionized water until they were processed in the fabrication of MEAs by hot-pressing.

The electrodes in these working examples were carbon cloth based electrodes of the type ELAT from E-TEK with a Pt loading of 0.6 mg $cm^{-2}$. The electrodes were Nafion-coated by spraying them with a 0.5 mass % solution of Nafion followed by drying under vacuum for about 2 h at 130° C. The amount of Nafion applied was about 0.6-0.7 $mg/cm^2$.

The membranes that were Nafion impregnated were dried in a vacuum oven at 120° C. for 1 hour. The membranes were then immersed in 0.5 wt % Nafion® ionomer solution. After 1 hour, the membranes were taken out, the solution on the surface was gently shaken off, and the samples were left to dry in the fume cupboard at room temperature for about 1 hour. Subsequently, the Nafion® ionomer coating was insolubilized by curing the membranes in the vacuum oven at 120°

C. for 2 hours. The membrane which was then to be bonded to the electrodes in wet state was re-swollen by immersing the sample in water at room temperature.

Another process for impregnating the radiation grafted membranes with soluble Nafion® ionomer leaves the membrane less brittle after the treatment. In this milder process, the membranes are dried in a vacuum oven at 60° C. for at least one hour, preferably a few hours. The membranes are then immersed in 0.5 wt % Nafion® ionomer solution overnight. The membranes are taken out and the excess solution is gently shaken off. The samples are left to dry in the fume cupboard for about 2 hours at room temperature. The membranes are subsequently cured in the vacuum oven at 60° C. for 2 hours.

Four types of NEAS based on FEP25 radiation-grafted membranes were evaluated for performance and compared against a standard MEA comprising Nafion® 112. Two samples were used as prepared (not impregnated with Nafion® ionomer). They were stored in water after membrane preparation.

Working Example 1

In experiment V150, an FEP-25 membrane having a graft level of 19.9% was used. This membrane was not impregnated with Nafion® ionomer prior to hot-pressing. The membrane was hot-pressed in the swollen state (FEP-hp (wet)) using ordinary hot-pressing conditions (120° C./18 MPa/3 min). The MEA was checked for leaks and then tested in a hydrogen/oxygen fuel cell test stand as described below.

Comparative Example 1

In experiment V203, a MEA was prepared from an FEP-25 membrane having a graft level of 19.5%. This membrane was also not impregnated with Nafion® ionomer prior to hot-pressing. This membrane was dried in the oven at 60° C. for 1 hour (no vacuum) prior to hotpressing (FEP-hp). All of the other MEA preparation conditions were the same as given above.

Working Example 2

In experiment V213, an FEP-25 membrane having a graft level of 19.0% was used. The membrane was impregnated with Nafion® ionomer as described in the previous section. This sample was hot-pressed in the wet state, having been re-swollen at room temperature in water overnight (FEP-ni-hp (wet)). The membrane was removed directly from water and the surface water was removed by blotting with a tissue. The membrane was then placed in contact with two electrodes. The MEA sandwich was then rapidly placed in a hot press, and laminated under milder conditions (110° C./5 MPa/3 min) because it was found that impregnated membranes are prone to cracking when using the standard hot-pressing conditions. The milder bonding conditions did not leave to an observably poorer quality of lamination.

Comparative Example 2

In experiment V211, a MEA was prepared from an FEP-25 membrane having a graft level of 17.9%. The membrane was impregnated with Nafion® ionomer and the MEA prepared according to the method of working example 2 (V213), except that the membrane in this comparative example was bonded in the dry state, after curing of the Nafion coating at 120° C., (FEP-ni-hp), after the sample had been removed from the oven from curing, as described above.

Comparative Example 3

In experiment V208, an MEA was fabricated from a Nafion® 112 membrane in the wet state (N112-hp (wet)).

An overview of the MEAs fabricated is shown in Table 1.

TABLE 1

Membranes fabricated to MEAs, using ETEK electrodes with 0.6 $mg_{Pt}$ cm$^{-2}$.

| MEA | Degree of grafting [%] | IEC [mmol g$^{-1}$] | Membrane state | Nafion® impregnation | Hotpressing conditions |
|---|---|---|---|---|---|
| COMP EX 3 N112-hp(wet) | — | 0.95 | wet | — | 120° C./18 MPa/3 min |
| COMP Ex 1 FEP-hp WE 1 | 19.5 | 1.44 | dry | No | 120° C./18 MPa/3 min |
| FEP-hp(wet) | 19.9 | | wet | No | 120° C./18 MPa/3 min |
| COMP EX 2 FEP-ni-hp WE 2 | 17.9 | 1.35 | dry | Yes | 110° C./5 MPa/3 min |
| FEP-ni-hp(wet) | 19.0 | 1.33 | wet | yes | 110° C./5 MPa/3 min |

These MEAs were tested in the test stands of the fuel cells group at PSI. Fuel cell testing was carried out in single cells with 30 cm$^2$ active area. The cells were operated with pure $H_2$ and $O_2$, using a gas flow rate of 1.5 times the amount required by the cell current. Cell temperature was 80° C., pressure of the reactant gases 1 $bar_a$ at the outlet. The hydrogen was humidified by bubbling through a water at a temperature of 80° C., the oxygen was fed to the cell without humidification. During startup, the cells were operated at a constant internal resistance of 0.05 ω, until performance of around 5 W was attained. Then, the operating mode was switched to constant current of 14.6 A (500 mA cm$^{-2}$).

Figure 2:
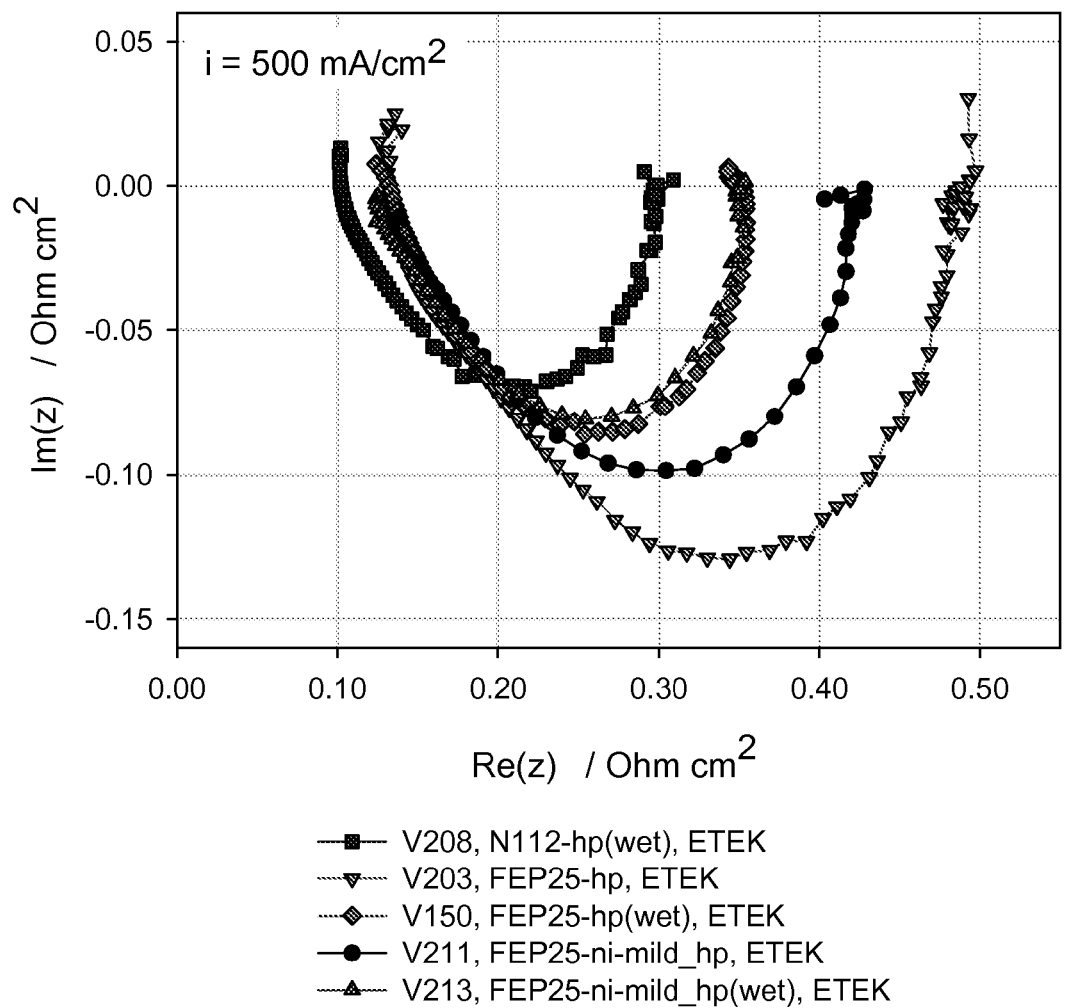
FIG. 2 depicts typical results of electrochemical impedance spectroscopic measurements of fuel cells containing the various MEAs described in the working and comparative examples.

In situ Characterization of MEAs Once the MEAs had been conditioned after start up and attained stable performance, the properties of the MEAs were characterized in situ by polarization experiments and electrochemical impedance spectroscopy. Typical cell polarization curves for the various MEAs are shown in FIG. 1. For the polarization experiment, the cell current density was varied in steps from open circuit voltage to the maximum current density. Equilibration time at each point was 20 S. Electrochemical impedance spectroscopy was carried out at the constant cell current density of 500 mA cm$^{-2}$ using an impedance kit from Zahner Elektrik (Kronach, Germany). Perturbation frequency was typically varied from 100 mHz to 25 kHz. Typical results for the characterization of the MEAS described in the working and comparative examples are shown in FIG. 2. The ohmic and charge transfer resistances measured in-situ by means of this electrochemical impedence spectroscopy method are summarized in Table 2.

Summary of Results: FIG. 1 shows typical cell polarization curves of fuel cells containing the MEAs of the working and comparative examples. The polarization properties of the cells containing MEAs based on the radiation-grafted membranes are significantly improved if the MEA is hot-pressed while the membrane is in a swollen state. This improvement is significant whether or not the membranes are impregnated with Nafion® ionomer prior to hot pressing (comparison of working example 2 and comparative example 2, and working example 1 versus comparative example 1, respectively).

TABLE 1

Summary of MEA resistances of working and comparative examples measured in-situ by means of electrochemical impedence spectroscopy

| Example | Experiment Number | $R_{ohm}$ mOhm cm$^{-2}$ | $R_{CT}$ mOhm cm$^{-2}$ |
|---|---|---|---|
| Working Example 1 | V150 | 132 | 222 |
| Comparative Example 1 | V203 | 132 | 358 |
| Working Example 2 | V213 | 124 | 229 |
| Comparative Example 2 | V211 | 129 | 297 |
| Comparative Example 3 | V208 | 101 | 195 |

FIG. 1 Typical cell polarization curves of fuel cells containing the various MEAs described in the working and comparative examples. Measurements were made after the MEAs had been conditioned subsequent to start up and attaining stable performance, typically about 100-150 hours. V150 (FEP25-hp (wet)) was actually measured after about 2,350 hours, but it had not degraded in performance versus the earlier measurements with this MEA.

FIG. 2 Typical results of electrochemical impedance spectroscopic measurements of fuel cells containing the various MEAs described in the working and comparative examples. Measurements were made after the MEAs had been conditioned subsequent to start up and attaining stable performance, typically about 100-150 hours. V150 (FEP25-hp (wet)) was actually measured after about 2,350 hours, but it had not degraded in performance versus the earlier measurements with this MEA.

The invention claimed is:

1. A method for manufacturing a membrane electrode assembly using an ion conducting membrane, comprising the steps of:
    providing an ion-conducting membrane in a pre-swollen state being impregnated with a ionomer;
    drying the pre-swollen ion-conducting membrane at elevated temperatures in order to remove residual solvent and to transform the ionomer into the form of an insoluble solid;
    after the drying step, re-swelling the ion-conducting membrane by immersing the ion-conducting membrane in a non-boiling solvent;
    coating of the ion conducting membrane on both sides with an electrode layer to form a sandwich; and
    hot-pressing the sandwich to form an ion conducting bond between the ion-conducting membrane and the electrode layers;
    wherein the ion conducting membrane is impregnated with an ionically conducting polymeric phase;
    wherein a duration of the re-swelling step is 4-5 hours.

2. The method according to claim 1, wherein a catalytic active layer is disposed between the electrode layer and the ion conducting membrane on both sides of the ion conducting membrane.

3. Method according to claim 2, wherein the electrode layer comprises one of carbon cloth, carbon paper and a carbon felt.

4. A method according to claim 2, wherein the electrode layer is exposed to a polar and hydrogen-bonding solvent.

5. The method according to claim 1, wherein the electrode layer comprises one of a carbon cloth, carbon paper and a carbon felt.

6. The method according to claim 1, wherein the hot-pressing condition are selected from at least one of the following conditions:
    a) temperature in the range of 70 to 150° C.;
    b) pressure in the range of 2 to 30 MPa; and
    c) duration time of hot-pressing treatment in the range of 15 to 400 seconds.

7. The method according to claim 1, wherein the catalytic active layer comprises at least one selected from the group containing platinum, ruthenium, rhodium, rhenium, nickel, rare earth and transition metals and compounds thereof.

8. A membrane electrode assembly, manufactured according to claim 1, comprising a hot pressed sandwich comprising:
    a first electrode layer;
    a second electrode layer; and
    an ion conducting membrane disposed between the first and second electrode layers;
    wherein the ion conducting membrane is in a pre-swollen status prior to the hot-pressing.

9. The membrane electrode assembly according to claim 8, wherein the depth of the ion conducting membrane is in the range of 5 to 250 μm.

10. A membrane electrode assembly according to claim 8, wherein a depth of the ion conducting membrane is in the range of 20 to 200 μm.

11. A method according to claim 1, wherein the ion conducting membrane is exposed to a polar and hydrogen-bonding solvent.

12. A method according to claim 1, wherein the hot-pressing conditions are selected from at least one of the following conditions:
    a) temperature in the range of 90 to 120° C.;
    b) pressure in the range of 5 to 18 MPa; and
    c) duration time of the hot-pressing treatment in the range of 60 to 240 seconds.

13. The method of claim 1, wherein the re-swelling is performed in water at approximately 80° C.

14. A method for manufacturing a membrane electrode assembly using an ion-conducting membrane, comprising steps of:
    swelling the ion-conducting membrane by immersing the ion-conducting membrane in an ionomer solution;
    after the swelling step, drying the ion-conducting membrane at elevated temperatures in a range from 120 to 140° C. so as to transform the ionomer into an insoluble solid, and so that the ion conducting membrane is impregnated with an ionically conducting polymeric phase;
    after the drying step, re-swelling the ion-conducting membrane by immersing the ion-conducting membrane in a non-boiling solvent;
    coating the ion-conducting membrane on both sides with an electrode layer to form a sandwich; and
    hot-pressing the sandwich to form an ion conducting bond between the ion-conducting membrane and the electrode layers;
    wherein the re-swelling step is performed using water at room temperature.

15. The method of claim 14, wherein the hot-pressing step is performed while the ion-conducting membrane is still in a wet state from the re-swelling step.

* * * * *